United States Patent
Sjoo

(10) Patent No.: US 9,981,330 B2
(45) Date of Patent: May 29, 2018

(54) TOOL AND A CUTTING INSERT FOR POWER SKIVING

(71) Applicant: SANDVIK INTELLECTUAL PROPERTY AB, Sandviken (SE)

(72) Inventor: Sture Sjoo, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 682 days.

(21) Appl. No.: 14/468,377

(22) Filed: Aug. 26, 2014

(65) Prior Publication Data
US 2015/0063927 A1 Mar. 5, 2015

(30) Foreign Application Priority Data
Aug. 27, 2013 (SE) ...................................... 1350983

(51) Int. Cl.
| | | |
|---|---|---|
| B23C 5/08 | (2006.01) |
| B23F 21/00 | (2006.01) |
| B23F 5/16 | (2006.01) |
| B23F 21/10 | (2006.01) |
| B23F 21/06 | (2006.01) |

(52) U.S. Cl.
CPC ............ B23F 5/163 (2013.01); B23F 21/066 (2013.01); B23F 21/106 (2013.01); *Y10T 407/174* (2015.01); *Y10T 407/24* (2015.01)

(58) Field of Classification Search
CPC ...... B23F 21/066; B23F 21/106; B23F 5/163; B23B 2205/12
See application file for complete search history.

(56) References Cited

U.S. PATENT DOCUMENTS

| | | | | |
|---|---|---|---|---|
| 1,629,667 | A | * | 5/1927 | Knipple .................. B23B 27/06 407/103 |
| 3,371,567 | A | * | 3/1968 | Davis ...................... B23B 29/24 407/108 |
| 4,170,164 | A | | 10/1979 | Nelson |
| 4,297,058 | A | * | 10/1981 | Armbrust .............. B23B 27/145 407/113 |
| 4,572,042 | A | * | 2/1986 | Wiman .................. B23B 27/141 407/113 |

(Continued)

FOREIGN PATENT DOCUMENTS

| | | | |
|---|---|---|---|
| CN | 1276747 A | 12/2003 |
| CN | 1537691 A | 10/2004 |

(Continued)

*Primary Examiner* — Sara Addisu
(74) *Attorney, Agent, or Firm* — Corinne R. Gorski

(57) ABSTRACT

A power skiving tool includes a basic body, which is equipped with a plurality of replaceable cutting inserts, by means of which chips can be carved or peeled out of a workpiece with the purpose of forming, for instance, teeth. The individual cutting insert is formed with only one cutting edge) and has a rear end in the form of a shoulder surface, against which an adjusting mechanism is pressed for the fine adjustment of the radial position of the cutting insert in relation to the basic body. On the underside of the cutting insert, there is in addition a control means, e.g. a serration connecting surface, which interacts with the corresponding control means in the appurtenant seat in the basic body. In addition, the invention concerns a power skiving cutting insert as such.

14 Claims, 11 Drawing Sheets

(56) References Cited

U.S. PATENT DOCUMENTS

Figure 3:
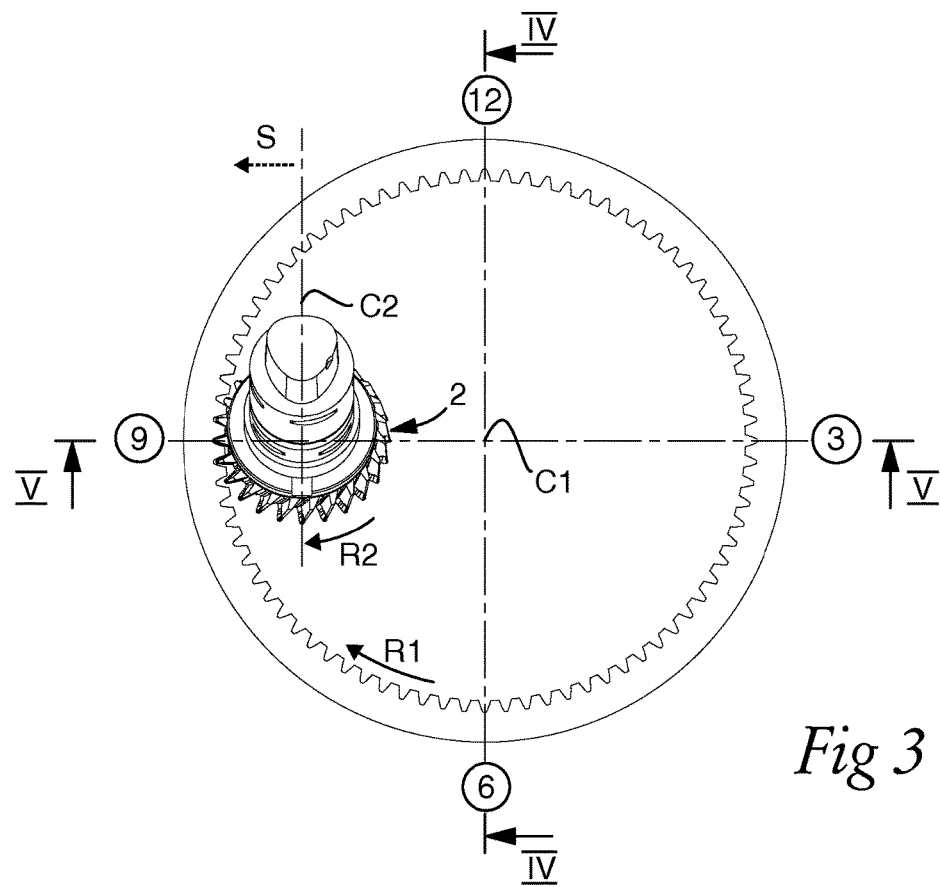

| | | | | |
|---|---|---|---|---|
| 4,720,220 | A * | 1/1988 | Bloch | B23F 21/083 407/118 |
| 4,993,893 | A * | 2/1991 | Niebauer | B23B 27/065 407/113 |
| 5,006,020 | A * | 4/1991 | Roos | B23B 27/145 407/113 |
| 5,205,678 | A * | 4/1993 | Britsch | B23F 21/086 407/104 |
| 5,593,254 | A | 1/1997 | Peters | |
| 5,921,721 | A * | 7/1999 | Hintze | B23B 27/1622 407/113 |
| 6,217,263 | B1 * | 4/2001 | Wiman | B23B 27/141 407/114 |
| 6,609,858 | B1 * | 8/2003 | Francis | B23F 21/226 407/113 |
| 6,986,626 | B2 * | 1/2006 | Gati | B23B 27/045 407/113 |
| 7,201,545 | B2 * | 4/2007 | Ejderklint | B23B 27/1611 407/101 |
| 7,217,070 | B2 * | 5/2007 | Hecht | B23B 27/141 407/113 |
| 7,645,100 | B2 * | 1/2010 | Andersson | B23B 27/065 407/113 |
| 7,794,182 | B2 * | 9/2010 | Lehto | B23C 5/1045 407/113 |
| 8,529,167 | B2 * | 9/2013 | Shaheen | B23B 27/1614 407/113 |
| 8,678,714 | B2 * | 3/2014 | Sture | B23F 21/166 407/23 |
| 8,926,232 | B2 * | 1/2015 | Sjoo | B23C 5/006 407/23 |
| 8,961,075 | B2 * | 2/2015 | Sagstrom | B23F 21/128 407/30 |
| 9,095,916 | B2 * | 8/2015 | Sjoo | B23F 21/166 |
| 9,120,154 | B2 * | 9/2015 | Hecht | B23B 27/1622 |
| 9,475,143 | B2 * | 10/2016 | Sjoo | B23F 21/223 |
| 9,878,384 | B2 * | 1/2018 | Sjoo | B23F 21/106 |
| 2002/0061235 | A1 * | 5/2002 | Maier | B23B 27/141 407/113 |
| 2003/0044246 | A1 * | 3/2003 | Erickson | B23F 21/226 407/21 |
| 2003/0123938 | A1 | 7/2003 | Grehn | |
| 2006/0216121 | A1 * | 9/2006 | Edler | B23B 27/1611 407/104 |
| 2007/0140798 | A1 | 6/2007 | Cole et al. | |
| 2007/0245866 | A1 * | 10/2007 | Wickman | B23B 27/065 82/1.11 |
| 2007/0292220 | A1 * | 12/2007 | Sjoberg | B23B 27/1611 407/66 |
| 2008/0206007 | A1 * | 8/2008 | Hughes | B23C 3/30 409/51 |
| 2010/0196107 | A1 * | 8/2010 | Ribbeck | B23C 3/28 407/22 |
| 2012/0207555 | A1 * | 8/2012 | Sjoo | B23F 21/166 407/114 |
| 2014/0010606 | A1 * | 1/2014 | Sagstrom | B23C 5/08 407/51 |
| 2014/0010607 | A1 * | 1/2014 | Wandeback | B23F 21/128 407/113 |
| 2014/0294525 | A1 * | 10/2014 | Hecht | B23B 27/145 407/103 |
| 2015/0037106 | A1 * | 2/2015 | Kovac | B23C 5/207 407/33 |
| 2015/0258618 | A1 * | 9/2015 | Haertel | B23C 5/08 409/131 |
| 2015/0306688 | A1 * | 10/2015 | Stadtfeld | B23F 21/126 407/20 |
| 2016/0067805 | A1 * | 3/2016 | Nickel | B23C 5/207 407/25 |
| 2017/0014923 | A1 * | 1/2017 | Marsh | B23F 21/143 |

FOREIGN PATENT DOCUMENTS

| | | | | |
|---|---|---|---|---|
| CN | 101090792 A | | 12/2007 | |
| CN | 102802856 A | | 11/2012 | |
| EP | 1314503 A1 | | 5/2003 | |
| EP | 2508288 A2 | | 10/2012 | |
| JP | 59107824 A | * | 6/1984 | ............ B23F 21/086 |
| JP | 2006255883 A | * | 9/2006 | ......... B23B 27/1611 |
| WO | 9847654 A1 | | 10/1998 | |
| WO | 2010102992 A1 | | 9/2010 | |
| WO | 2010142578 A1 | | 12/2010 | |

* cited by examiner

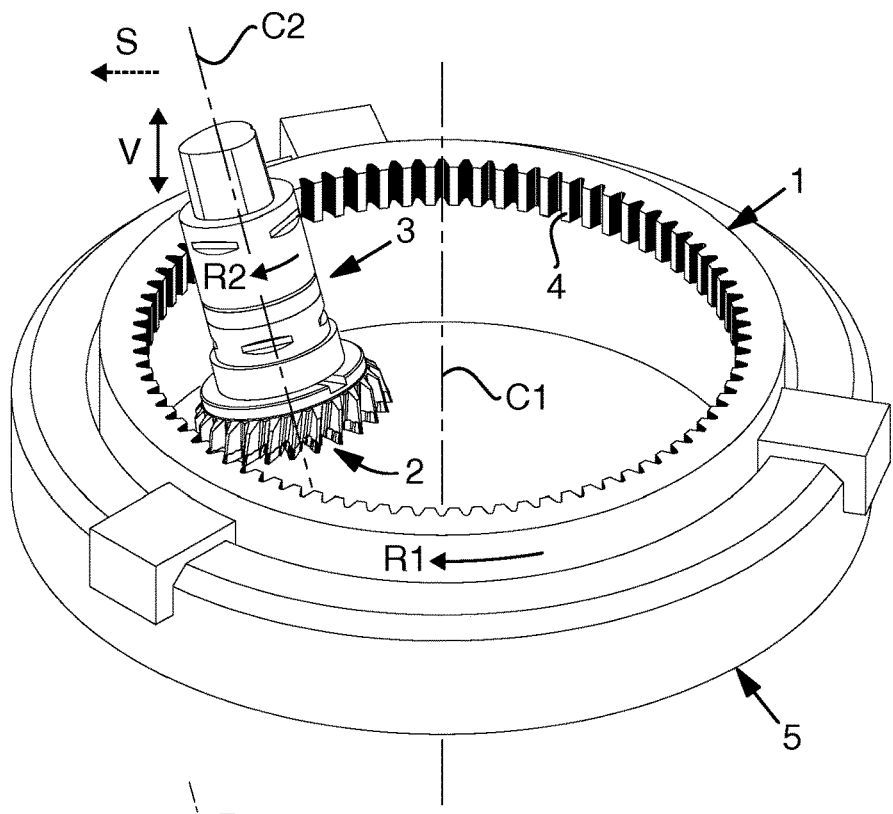
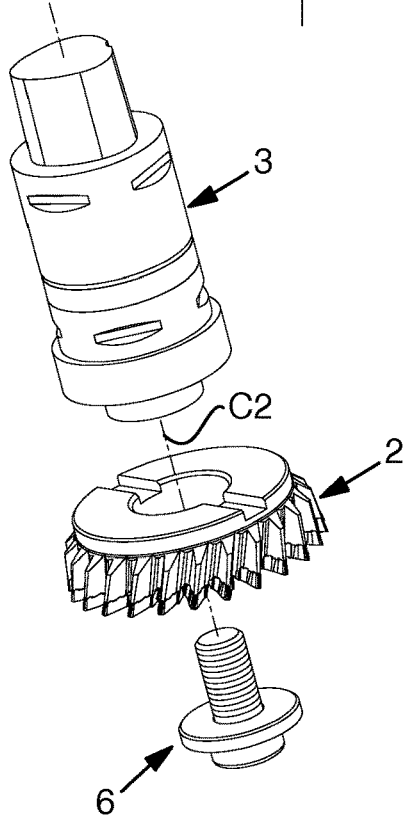
Fig 1
Fig 2

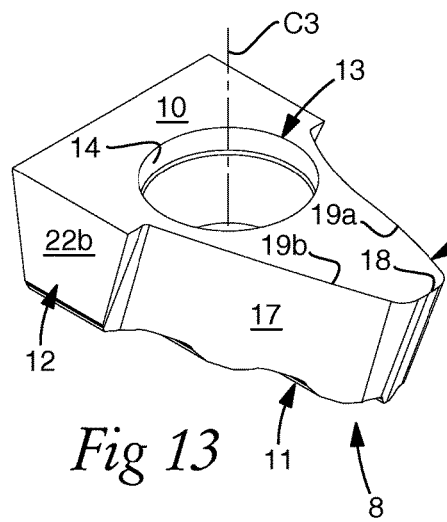
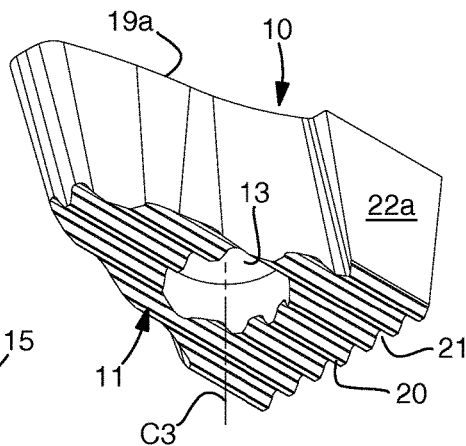
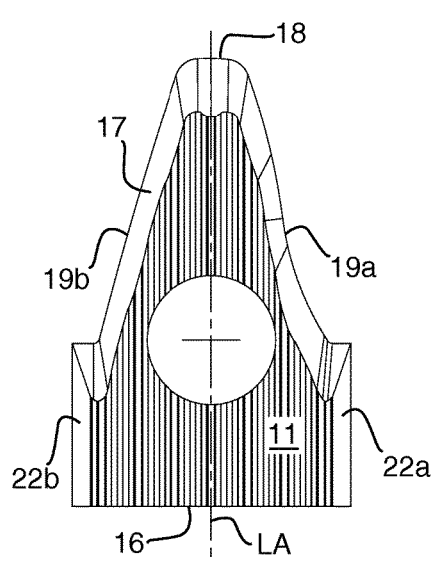
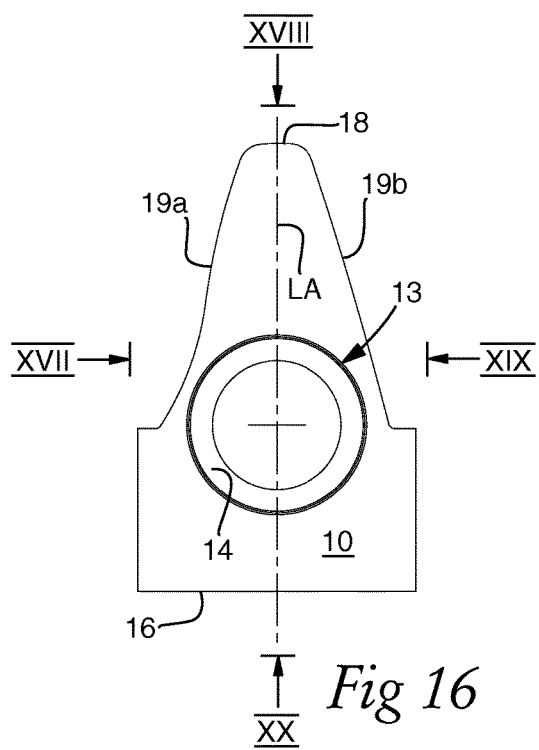
Fig 13
Fig 14
Fig 15
Fig 16

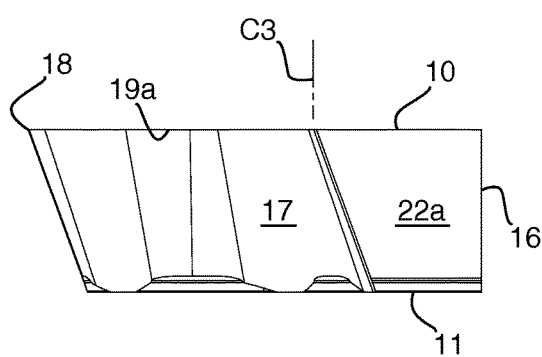
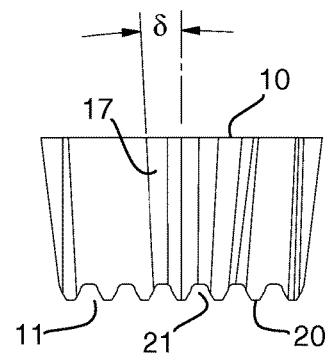
Fig 17　　　Fig 18
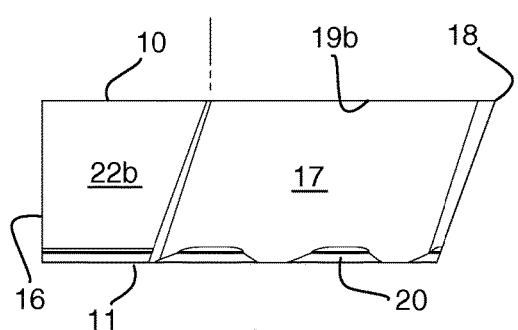
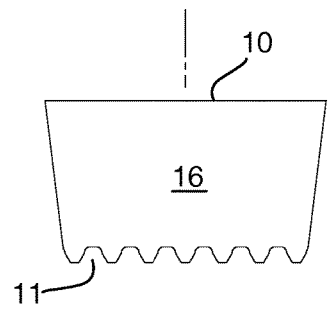
Fig 19　　　Fig 20

US 9,981,330 B2

TOOL AND A CUTTING INSERT FOR POWER SKIVING

RELATED APPLICATION DATA

This application claims priority under 35 U.S.C. § 119 to SE Patent Application No. 1350983-1 filed on Aug. 27, 2013, which the entirety thereof is incorporated herein by reference.

TECHNICAL FIELD

In a first aspect, a power skiving tool includes a basic body having a peripheral rim, which is located in a reference plane extending perpendicular to a centre axis, around which the rim is rotationally symmetrical. The rim includes a plurality of tangentially spaced-apart seats, which individually include a bottom formed in the proper rim, as well as in a projection protruding radially from the same in which a hole having a female thread mouths. The tool also includes a plurality of replaceable cutting inserts. Each of the cutting inserts has an upper side, an under side, an endless circumference surface extending between the same, as well as a through hole, which extends between the upper and under sides. Each individual cutting insert has a length extension, which is defined by a longitudinal axis extending between front and rear ends, and includes a cutting edge, which is formed between a chip surface included in the upper side and a clearance surface included in the circumference surface. The cutting edge has three part edges, a nose edge and two flank edges converging toward the same. Each individual cutting insert is mounted in an appurtenant seat with a nose edge protruding radially from the basic body, and fixed by means of a tightening screw, which is tightened in the female thread, besides which the cutting edges of the cutting inserts are laterally tipped-in at a lateral tipping-in angle of at least 5° in relation to the reference plane of the basic body.

In a second aspect, a power skiving cutting insert as such.

BACKGROUND

Power skiving is a denomination of a chip removing machining method, which makes use of a combination of rotary and rectilinear relative motions between a milling tool and a workpiece. Above all, the method is used in connection with the forming of teeth, splines, and the like, and allows internal, as well as external machining. The method as such is known and offers considerable advantages in comparison with traditional tooth-forming methods of the type that makes use of chip removing gear shaping and that is based on a cutting member being brought rectilinearly to and fro in order to, layer by layer, cut away material while forming a slot, which finally forms a gash of a full depth. After the shaping of the individual gash, the tool and the workpiece are readjusted stepwise so as to form, in an analogous way, all the gashes that are included in a complete gear rim. Such gear shaping is time-consuming and thereby expensive, in particular when the number of teeth is large.

In contrast to gear shaping, power skiving only requires a minimum of tool readjustments in that the tool during a planetary relative motion in relation to the workpiece is kept in constant rotation in order to remove, from each gash to be made, only one fragmentary chip, at the same time as the tool is given a rectilinear axial feeding motion. In such a way, all gashes are machined to a certain, per se moderate, depth before the tool needs to be readjusted for providing an increased radial feeding.

The earliest developed power skiving tools (see, e.g., EP 2422920, WO2010102992, and EP 2440357) make use of solid milling cutter heads, of cemented carbide, i.e., bodies in which the requisite cutting edges are integrated and therefore can be given a great spatial dimensional accuracy in relation to the rotation axis of the tool.

However, a disadvantage of solid power skiving tools is that they can successfully only be realized in small embodiments, more precisely with diameters of up to 150 mm and a maximum of approximately 10 cutting edges. For the machining of large workpieces, e.g. gear rings having more than 100 teeth, greater tools are desired, i.e., tools having a greater diameter and more cutting edges.

Another disadvantage is that the tool has to be discarded (or be subjected to extensive repair work) if any single cutting edge is damaged. For these reasons, a development of power skiving tools having replaceable cutting inserts, most often more than 10 in number, has recently started.

An initially mentioned power skiving tool, having as many replaceable cutting inserts as 20, is previously known by open use (manufactured by VBMT). In this case, the cutting inserts have a rhombic basic shape and include two diametrically opposed and alternately usable cutting edges of identical shape. The cutting insert is mountable in a seat, which, in addition to a flat bottom, includes two V-shaped diverging side support surfaces, and fixable by means of a tightening screw, which is centrally arranged in the cutting insert and presses the cutting insert against the bottom, as well as the two side support surfaces in the seat.

A problem of this known power skiving tool is, however, that good accuracy of the radial adjustment of the cutting inserts in relation to the basic body of the tool is difficult to realize. Namely, if the individual cutting insert and/or the receiving seat in the basic body would be impaired by form defects, the active, radially outer cutting edges will not be located exactly along a common circle. This result in defects in the flank surfaces of the formed teeth, more precisely in such a way that repetitive slots arise in/of the tooth flanks, if one or a few cutting inserts would protrude further than other ones. On the other hand, it applies that repetitive crests in the flanks arise if one or a few cutting edges would be located further in than other ones. Therefore, the desired surface quality of the tooth flanks requires a setting accuracy or tolerance in the order of 0.001-0.002 mm, something that is practically difficult, not to say impossible, to achieve in the known power skiving tool.

Another disadvantage of this is that the cutting inserts become fairly blunt-cutting, something that may lead to a strong generation of heat and that the rotating workpiece together with the tool has to be driven at a limited number of revolutions. A shortcoming of the known tool is furthermore that the cutting inserts, by their rhombic and mirror-symmetrical shape, may present difficulties to produce deep gashes and teeth, respectively, having a more complicated shape, such as involute teeth.

By SE 0103951-0 (publication number SE523286), a milling tool is previously known in the form of a face mill or end mill having a basic body, which is equipped with tangentially spaced-apart cutting inserts, which are mounted in each a seat in the axially rear end of which an adjusting mechanism is arranged for the fine adjustment of the axial position of the individual cutting insert in relation to the basic body. In this case, the cutting inserts are indexable by including two opposite and alternately usable cutting edges adjacent to the same number of clearance surfaces. When one, face milling cutting edge is indexed up into an active position, the clearance surface of the opposite cutting edge is kept pressed against a movable jaw included in the adjusting mechanism. This entails a risk of the fine adjustment of the cutting insert being jeopardized, namely if the used cutting edge—and its clearance surface—which is turned rearward toward the adjusting mechanism, has been damaged, e.g. by chipping or plastic material deformation as a consequence of strong generation of heat. Namely, if possible damage propagates to the clearance surface, even such moderate deformations as approx. 0.1 mm will make impossible predeterminable fine adjusting in the range down to 0.001 mm. By forming, in accordance with the invention, the cutting insert with only one, front cutting edge at the same time as the rear end of the cutting insert consists of a shoulder surface interacting with the adjusting mechanism, the above-mentioned risk is obviated.

SUMMARY

The present invention aims at obviating the above-mentioned disadvantages of the known power skiving tool, and at providing an improved tool for power skiving purposes. Thus, a primary aspect is to provide a power skiving tool, the cutting inserts of which can generate teeth or spline formations having flank surfaces of a good, repeatable surface quality. Furthermore, the tool should be able to form gear rims having deep gashes and tooth shapes of a more complicated nature, such as involute teeth. A further aspect is to provide a power skiving tool, which can be driven at a high number of revolutions in order to reduce the time and cost of the machining to a minimum.

Accordingly, the individual cutting insert is formed with only one cutting edge, the nose edge of which forms the front end of the cutting insert at the same time as the rear end of the cutting insert consists of a shoulder surface, which runs perpendicular to the longitudinal axis of the cutting insert and is pressed against an adjusting mechanism arranged in an inner part of the appurtenant seat for the fine adjustment of the radial position of the cutting edge in relation to the center axis of the basic body, besides which the underside of the cutting insert includes at least one long narrow, female-like or male-like guide member, which runs parallel to the longitudinal axis of the cutting insert and is in engagement with an interacting, long narrow male-like or female-like guide member included in the bottom of the seat.

In this way, the cutting insert may be manufactured with very good dimensional accuracy (tolerances within the range of 0.001-0.005 mm) by the cutting edge as well as the rear shoulder surface being ground, at the same time as the cutting insert can be radially fine adjusted, more precisely in steps of 0.001 mm. In other words, all cutting inserts can be adjusted in such a way that they collectively are tangent to a circle with tolerances of 0.001 mm or less. In such a way, a very good surface quality of the flank surfaces generated in the workpiece is guaranteed.

In an embodiment, the guide members are included in the underside of the cutting insert and the bottom of the seat, respectively, in serration connecting surfaces of the type that comprises a plurality of mutually parallel ridges and grooves, the ridges of which on the cutting insert engage the grooves in the bottom of the seat and vice versa.

In another embodiment, the rear shoulder surface of the cutting insert is flat and extends at a right angle not only to the longitudinal axis of the cutting insert but also to the underside thereof. In such a way, the forces from the basic body and the adjusting mechanism will be applied to the cutting insert in its plane, i.e., without a tendency to tip up the rear part of the cutting insert.

In yet another embodiment, the two flank edges of the cutting insert are unsymmetrical in relation to the longitudinal axis of the cutting insert by having different contour shape or cutting edge lines. In such a way, the entering of the cutting edge into the gash to be made is facilitated, in particular when the gash is deep.

In order to provide involute teeth, the entering flank edge of the cutting insert may have a slightly S-like contour shape, whereas the other flank edge has a slightly C-like, convex contour shape.

In yet another embodiment, the cutting edges of the individual cutting insert are radially tipped-in at a radial tipping-in angle in relation to the reference plane. In other words, the cutting edges of the cutting inserts are tipped-in toward the center axis of the rim. Such a radial tipping-in of the cutting inserts makes cutting easier and the sound level during the cutting process is decreased and thus more pleasant for the operator. The radial tipping-in angle amounts preferably to at least 2° and at most 15°, and in an exemplified embodiment, the radial tipping-in angle amounts to 10°.

In a further embodiment, the lateral tipping-in angle amounts to at most 30°, and in an exemplified embodiment, the lateral tipping-in angle amounts to 20°. The lateral tipping-in causes a peeling or carving effect, which cuts out the gash to be made, wherein a greater inclination gives a greater carving effect.

With respect to both the lateral and radial tipping-in, it is important that at least the cutting edges are situated in a plane that leans, in accordance with as previously mentioned. Thus, it is less important that the entire cutting insert has a lateral tipping-in and/or a radial tipping-in.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE APPENDED DRAWINGS

Figure 4:
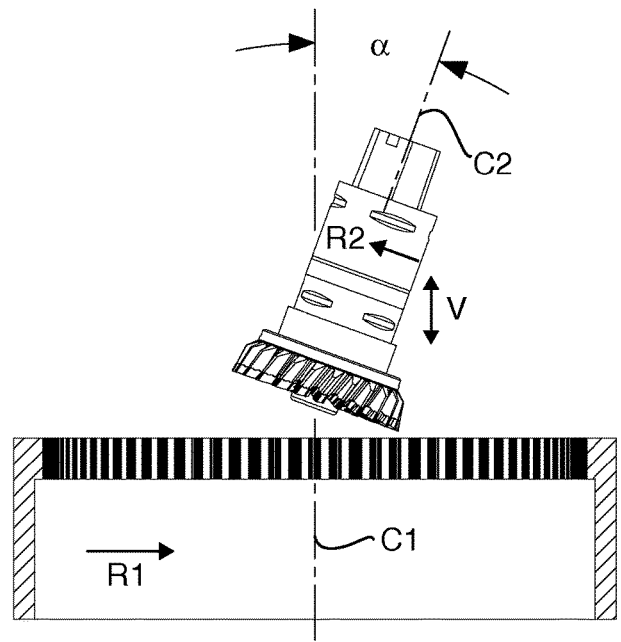
Figure 5:
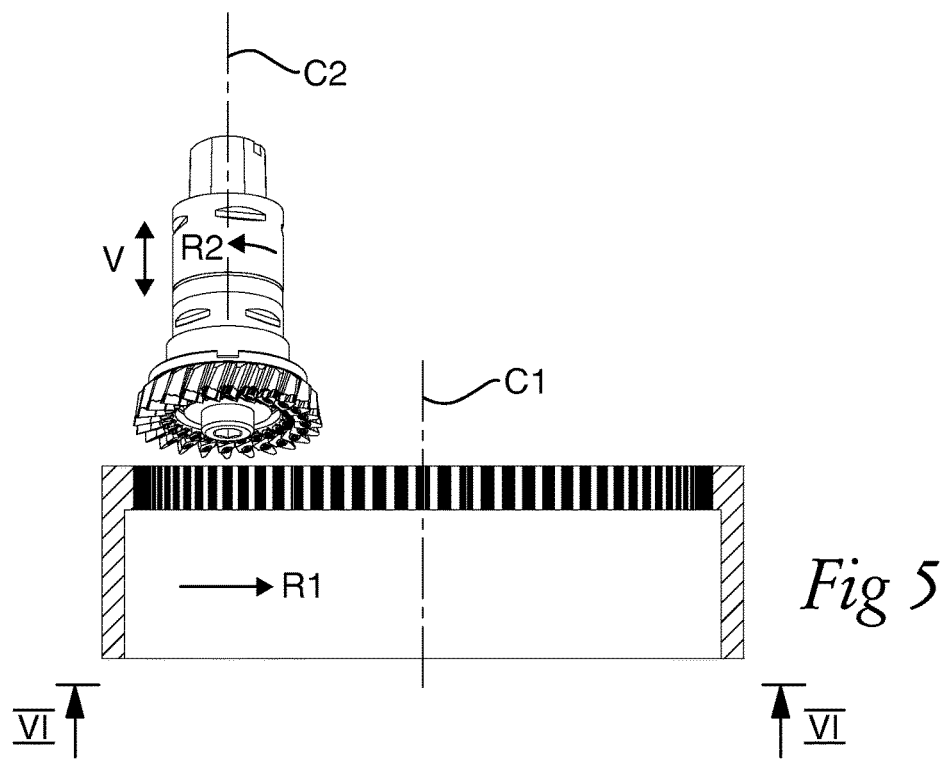
Figure 6:
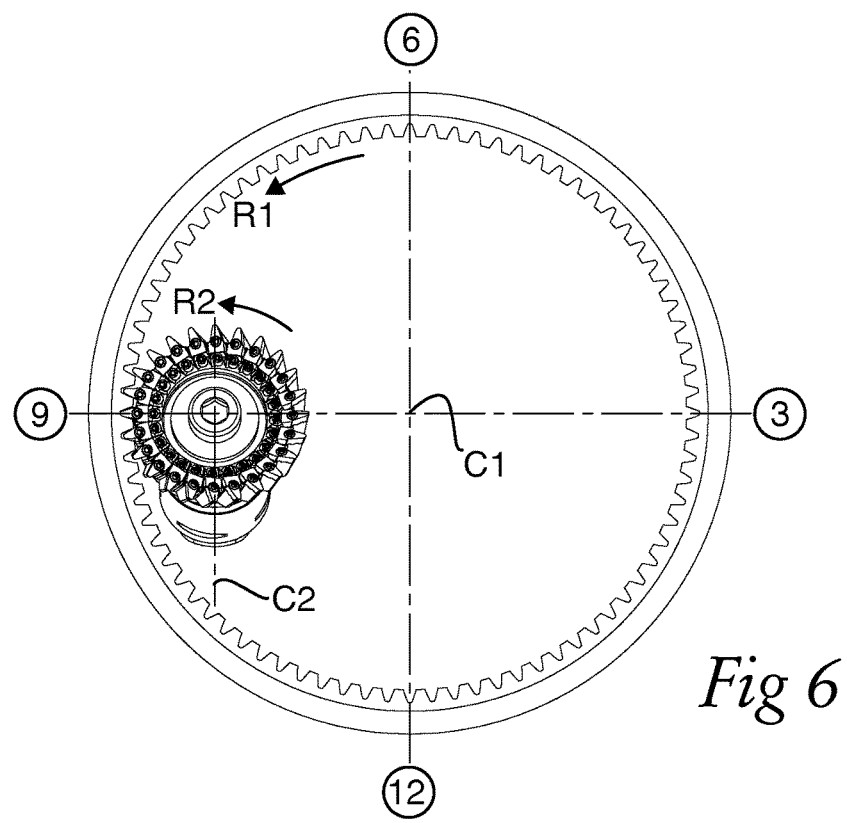
Figure 7:
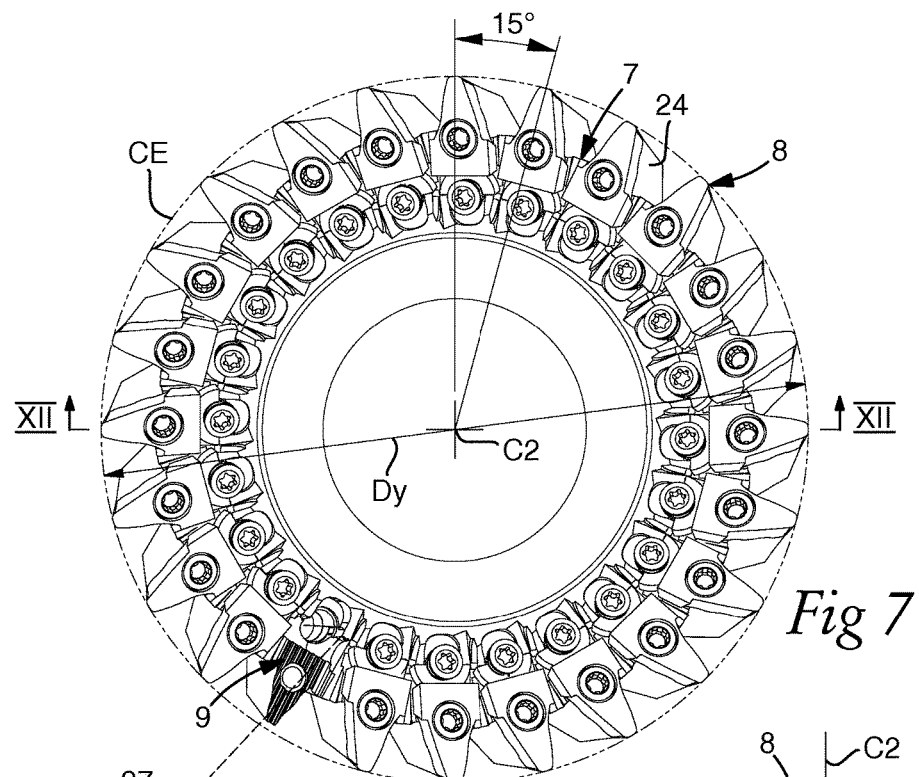
Figure 8:
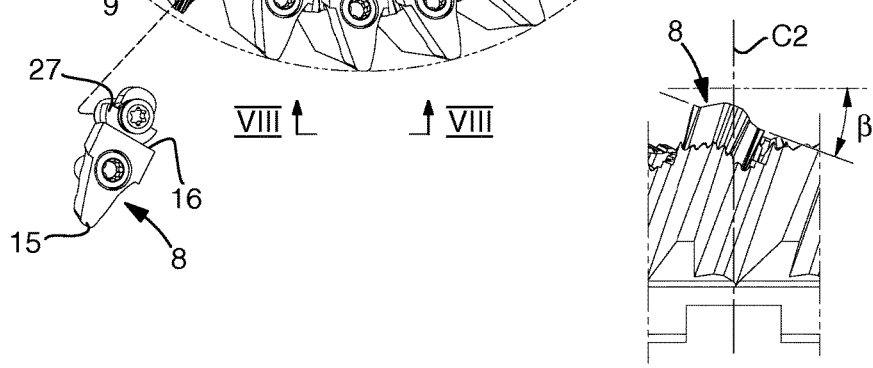
Figure 9:
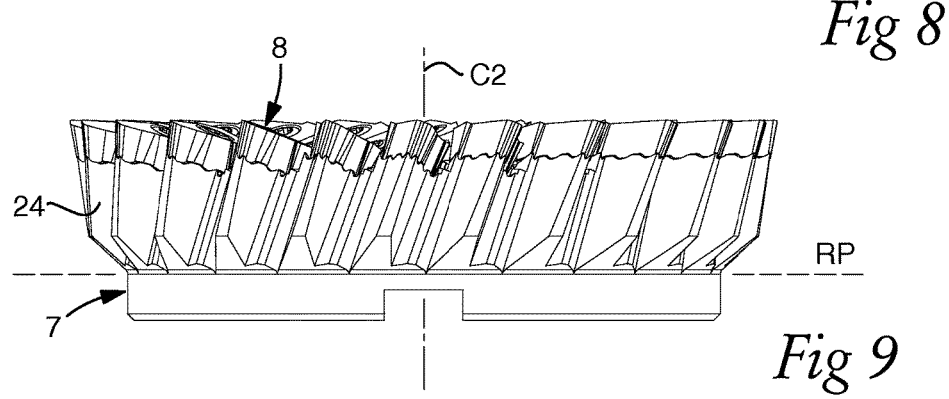
Figure 10:
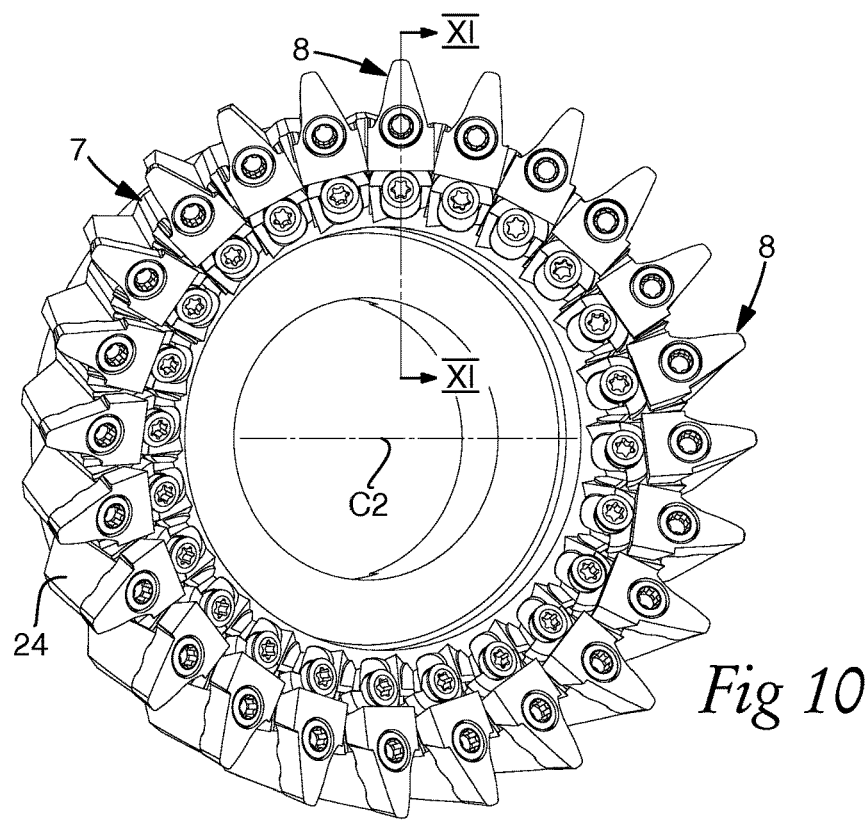
Figure 11:
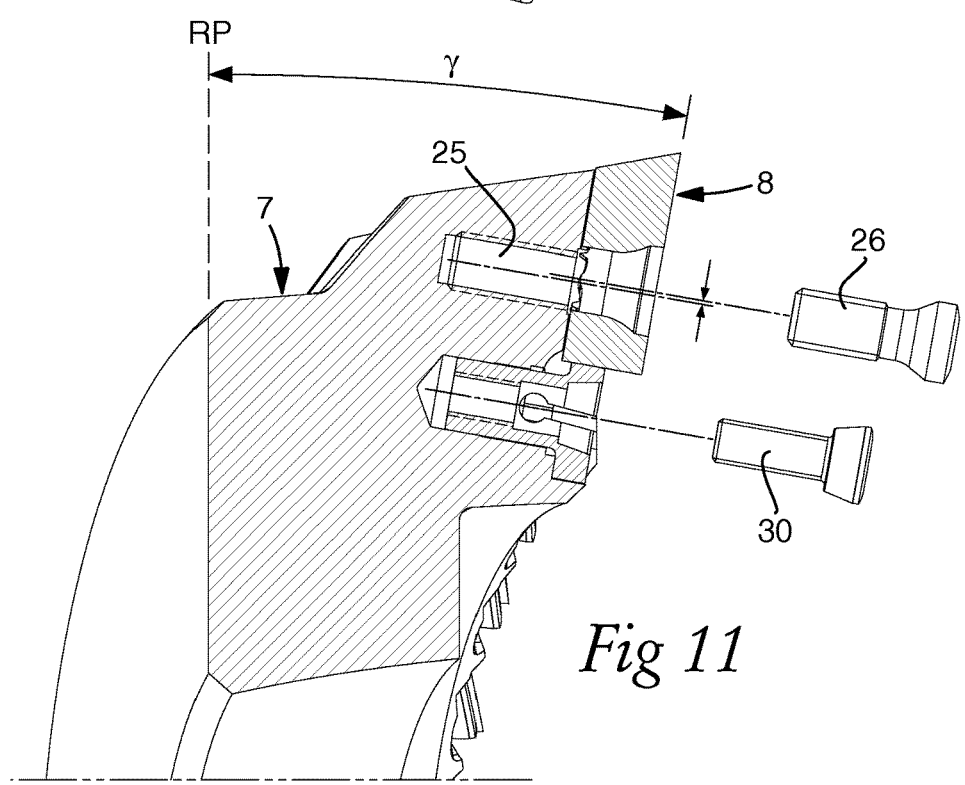
Figure 12:
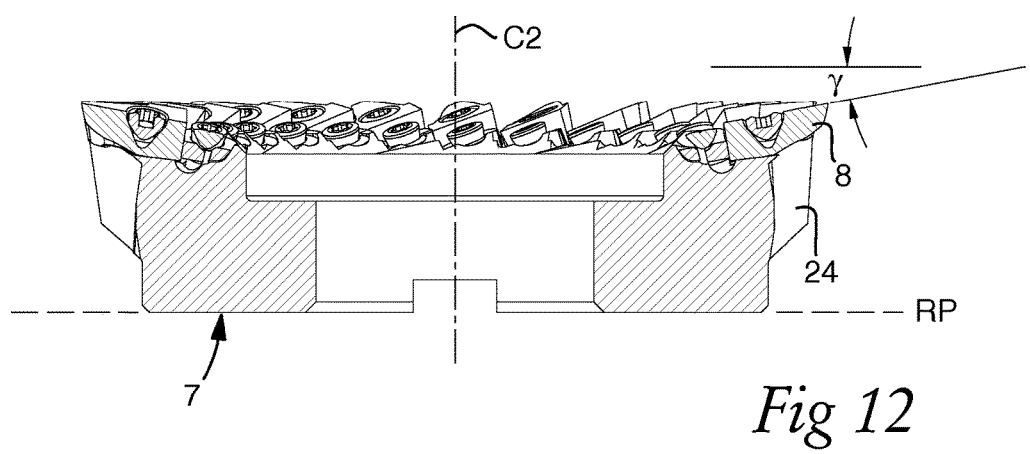

In the drawings:

FIG. 1 is a perspective view showing the power skiving tool according to the invention during the machining of a ring-shaped workpiece, FIG. 2 is a perspective exploded view showing how the tool is removably applied to a rotatable machine spindle, FIG. 3 is a planar view from above of the workpiece as well as the tool shown in FIG. 1, FIG. 4 is a cross-section taken along line IV-IV of FIG. 3 running between "12 o'clock" and "6 o'clock", FIG. 5 is a cross-section taken along line V-V of FIG. 3 running in the direction "9 o'clock" and "3 o'clock", FIG. 6 is a planar view taken along line VI-VI of FIG. 5, showing the tool as viewed from below, FIG. 7 is a planar view from above of the tool, wherein it should be observed that the plane of the tool coincides with the plane of the drawing, FIG. 8 is a partial, enlarged detailed end view taken along line VIII-VIII of FIG. 7, FIG. 9 is a side view of the tool, FIG. 10 is a perspective view of the upper side of the tool, only one of the numerous cutting inserts (the top one) being located approximately in the plane of the drawing, FIG. 11 is an enlarged cross section taken along line XI-XI of FIG. 10, FIG. 12 is a through cross section taken along line XII-XII of FIG. 7, FIG. 13 is an enlarged top view of an individual cutting insert included in the tool, FIG. 14 is a bottom view of the same cutting insert, FIG. 15 is a planar view from below of the cutting insert, FIG. 16 is a planar view from above of the cutting insert, FIG. 17 is a side view of the cutting insert as viewed in the direction of the arrow XVII in FIG. 16, FIG. 18 is an end view from the front of the cutting insert (see the arrow XVIII in FIG. 16), FIG. 19 is a side view XIX in FIG. 16

Figure 21:
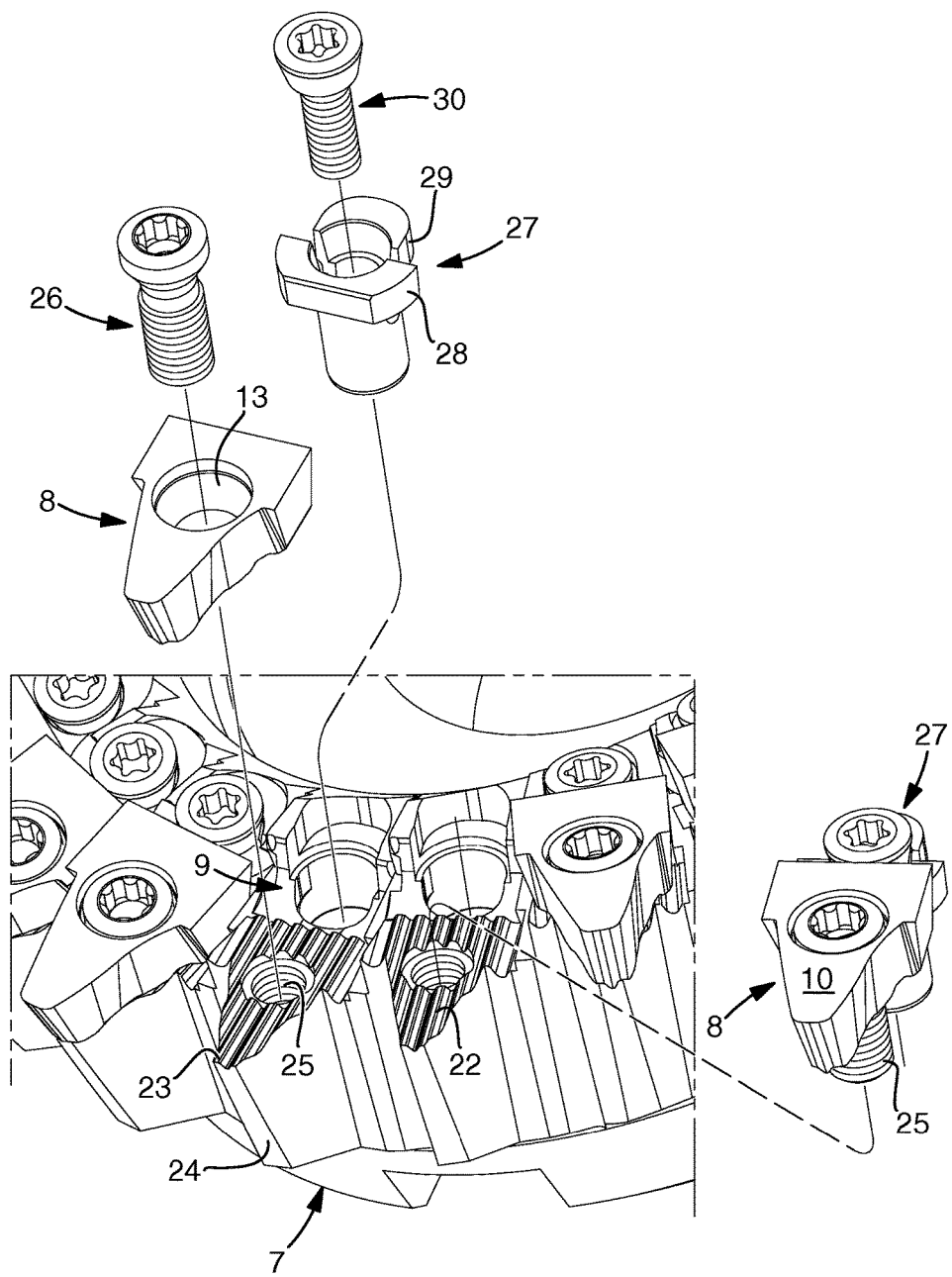
Figure 22:
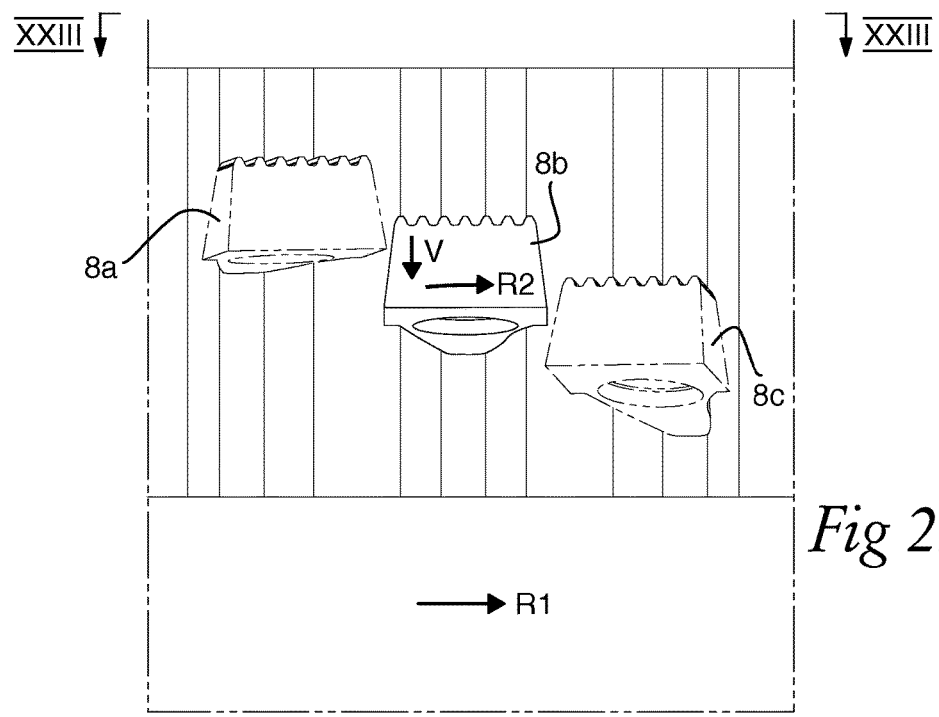
Figure 23:
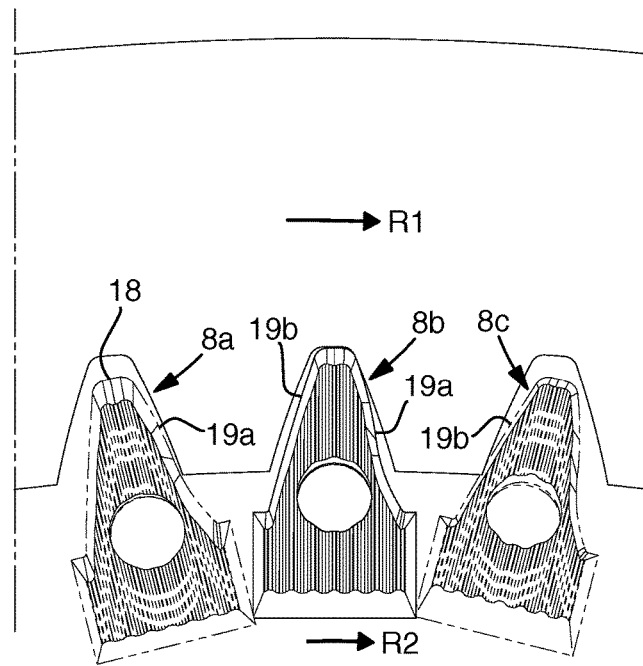
Figure 24:
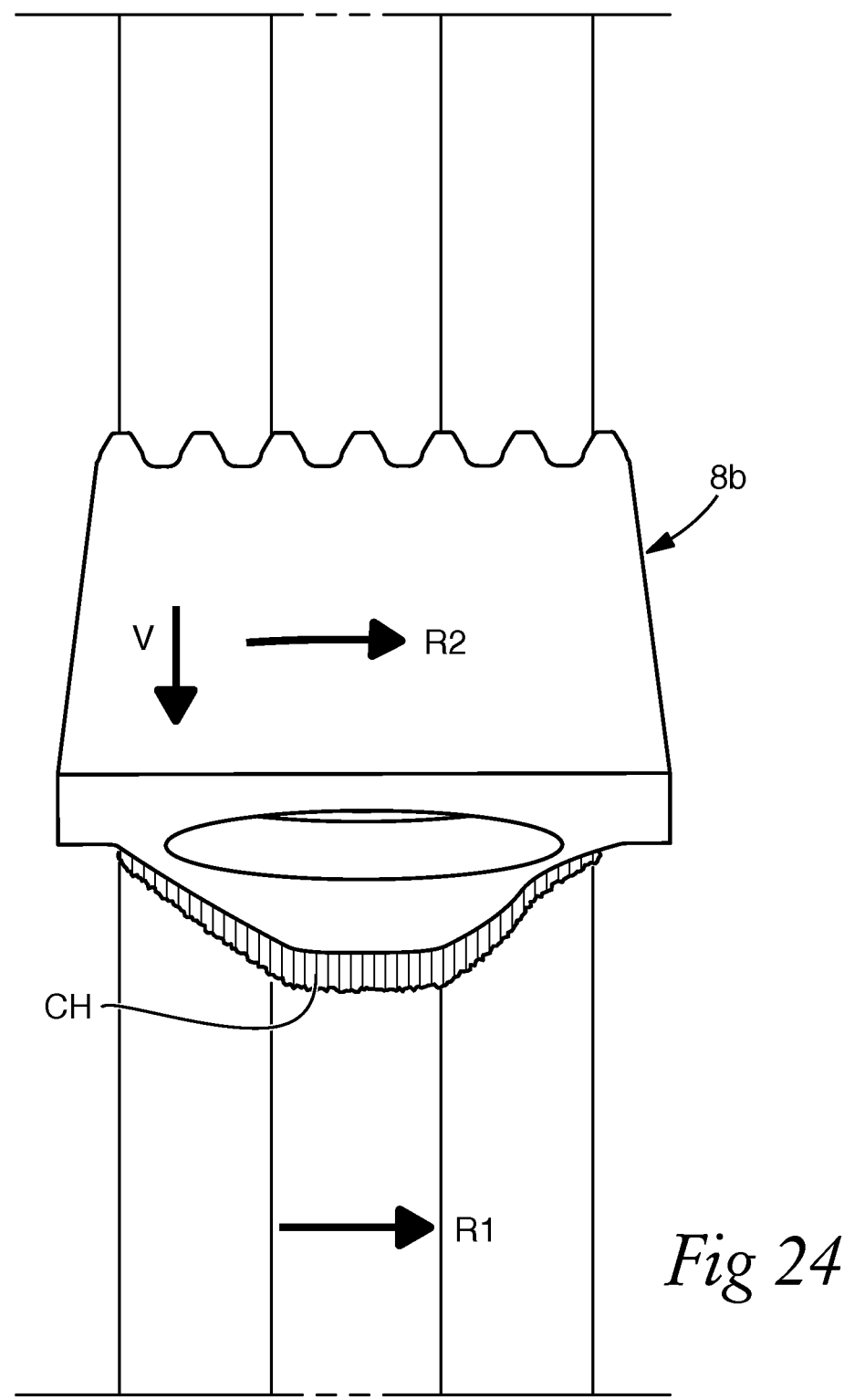

FIG. 20 is an end view XX from behind of the cutting insert,

FIG. 21 is a perspective exploded view showing how the cutting insert is mountable in a peripheral seat of the basic body of the tool, more precisely together with an adjusting mechanism, FIG. 22 is a side view of a group of three cutting inserts during internal machining of the workpiece, FIG. 23 is a planar view XXIII-XXIII in FIG. 22, and FIG. 24 is a further enlarged detailed side view showing only one of the cutting inserts in operation.

DETAILED DESCRIPTION

Before the tool according to the invention is described more thoroughly, reference is made to FIGS. 1-6, which illustrate how the power skiving method can be applied in practice, more precisely in connection with the production of internal teeth. In the drawings, 1 generally designates a workpiece and 2 a tool, which is removably arranged on a rotatable, driving machine spindle 3. As seen in FIG. 2, in this case, the tool 2 is placed on a lower end of the spindle 3, and fixable on the same by a suitable means, e.g. a bolt 6. The workpiece 1, which may consist of steel or the like, is generally ring-shaped or tubular, and formed with an internal gear rim 4, which for the sake of clarity is shown in a finished state.

As shown in FIG. 1, the workpiece 1 is clamped in a holder or chuck 5, which is included in the present machining station and rotatable for subjecting the workpiece to a rotation on a center or rotation axis C1, more precisely in the direction of the arrow R1. The spindle 3, and thereby the tool 2, is rotatable on a center axis C2 in the direction of the arrow R2. This axis C2 is inclined at an acute angle α (see FIG. 4) in relation to the rotation axis C1 of the workpiece. In an example, α amounts to 20°.

Although the holder 5 and the spindle 3 may together assume arbitrary positions in the space, provided that the mutual location remains intact, in the example, it has been selected to place the workpiece in a horizontal plane with the spindle 3 sticking upward and with the upper side of the tool 2 turned downward. In such a way, an advantage is gained in that the chips generated during the machining process automatically fall down and are evacuated by means of the gravitation.

The relative motions between the workpiece and tool that are required to carry out a power skiving operation, are realized by the workpiece being retained in the horizontal plane (i.e., without being raised or lowered), while the tool 2 is raisable and lowerable, more precisely vertically as shown by means of the double arrow V. The requisite planetary relative motion between the workpiece and the tool is executed by the rotation of the workpiece while the tool remains in a position "9 o'clock" in FIG. 3. Furthermore, the tool 2 may be advanced stepwise in the direction of the arrow S, i.e., radially in relation to the center axis C1, more precisely with the purpose of providing a radial output of the tool in order to stepwise increase the depth of the generated gashes until a full depth has been attained.

It should furthermore be noted that the tool 2 is shown from above in FIG. 3, more precisely in a state lifted above the workpiece (see FIG. 4) and in the position "9 o'clock" (see FIG. 3) along the inside of the workpiece. Also in FIGS. 5 and 6, the tool 2 is shown lifted from the workpiece, but here as viewed from below.

Characteristic of power skiving as a machining method is—as has initially been indicated—that the workpiece 1 as well as the tool 2 is rotated at the same time as they are subjected to rectilinear relative motions for producing an axial feed. More precisely, the tool is rotated in one and the same direction (R2) as the workpiece 1 (R1), at the same time as the tool is given an axial, vertical and downwardly directed feeding motion according to the arrow V. In doing so, the number of revolutions of the workpiece and tool is adapted in relation to each other so that the respective periphery speeds become equally large. In such a way, in each engagement in the inside, individual cutting inserts (see the cutting insert "9 o'clock" in FIGS. 3 and 6) can hit one and the same vertically oriented gash to be made. Although the cutting insert accompanies the ring at one and the same periphery speed, the same will also make a relative rotary motion, during which an essentially V-shaped chip "is carved" or cut out of the gash to be made. Such a fragmentary "carving out" of diminutive, V-shaped chips is repeated cyclically until the tool has accomplished an axial feeding operation from an upper position to a lower, where the cutting inserts have left the workpiece. Then, the tool is advanced radially to a new cutting depth in the direction of the arrow S, whereupon the operation is repeated until the gashes have received a full depth.

Reference is now made to FIGS. 7-12, which show how the tool 2 according to the invention includes a basic body 7, as well as a plurality of cutting inserts 8. In this case, the basic body 7 has the shape of a ring or rim, which is located in a reference plane RP (see FIG. 9) extending perpendicular to the center axis C2, in relation to which the ring is rotationally 255 symmetrical. In the periphery of the basic body, a plurality of tangentially spaced-apart seats 9 (see FIG. 7) are formed, each one of which houses an individual cutting insert 8. In the example shown, the pitch between the seats 9 amounts to 15° (see FIG. 7), implying that the basic body in this case is equipped with totally 24 cutting inserts. Free, external ends of the cutting inserts should be equidistantly radially spaced apart from the center axis C2 for commonly being tangent to a circle CE (the diameter of which is designated $D_y$).

In a way characteristic for power skiving, the cutting inserts and their cutting edges (as seen in FIGS. 8 and 9) are laterally tipped-in at an angle β in relation to the reference plane RP. This angle β amounts in the example to 20°, but may vary upward as well as downward from this value. However, β should neither be less than 5° nor be more than 30°.

In accordance with a preferred embodiment of the invention, the cutting inserts 8 are in addition radially tipped-in in relation to the reference plane RP. This is most clearly seen in FIG. 11, where γ designates a radial tipping-in angle, which in the example amounts to 10°. Also this angle may vary, not only upward but also downward, from said value. However, it should amount to at least 2° and at most 15°. In order not to cause uncertainties, here it should be pointed out that the basic body 7 is shown in perspective in FIG. 10 and that the cutting insert shown exactly in the section XI-XI has its plane oriented approximately parallel to the plane of the drawing, whereas the other cutting inserts are angled in relation to the latter.

In this connection, it should also be mentioned that the exemplified embodiment of the cutting insert is of uniform thickness, implying that its upper and undersides are mutually parallel. For this reason, the tipping-in of the cutting insert is laterally (the angle β), as well as radially (the angle γ) provided by the seats 9 of the basic body being formed with their bottoms inclined at the respective angles in relation to the reference plane RP.

As a consequence of the above-mentioned radial tipping-in γ, the set of cutting inserts 8 will form a cup-formed, slightly cone-shaped configuration, as seen from the section in FIG. 12.

The detailed design of the cutting insert 8 is seen in FIGS. 13-20. In a traditional manner, the cutting insert is manufactured from cemented carbide (or another hard material having large resistance to wear) and comprises an upper side 10, an underside 11, and a circumferential and endless circumference surface generally designated 12.

A through hole 13, the center axis of which is designated C3, extends between the upper and undersides 10, 11. The major part of this hole is cylindrical, but adjacent to the upper side 10 the hole widens into a funnel-like, approximately conical section 14. It should also be noted that the cutting insert has a length extension, which is defined by a longitudinal axis designated LA.

Characteristic of the shown cutting insert is that the same is formed with only one cutting edge (generally designated 15), which is located in a front part of the cutting insert, at the same time as its rear end consists of a shoulder surface 16, which in this case is flat and runs perpendicular to the longitudinal axis LA.

The single cutting edge 15 is formed between, on one hand, the front part of the upper side 10, which forms a chip surface (lacks reference designation), and, on the other hand, a clearance surface 17, which is positioned under the same, as well as is included in and being a part of the circumference surface 12. The cutting edge 15 includes three part edges, viz. a nose edge 18 and two flank edges 19a, 19b, which diverge in the backward direction from the nose edge. In other words, the front part of the cutting insert tapers toward the nose edge 18. The clearance surface 17 has—depending on the selected radial tipping-in angle γ—a circumferential clearance angle δ (see FIG. 18) that may vary from 7° and upward. The greater the γ, the greater the δ. If γ amounts to 10°, as in the example, δ should, at least along the nose edge, amount to 17°.

As may be best seen in FIGS. 14 and 18, in the underside 11 of the cutting insert, there is formed a serration connecting surface of the type that includes a plurality of long narrow and mutually parallel ridges 20 and grooves 21, which run in the length extension of the cutting insert, i.e., parallel to the longitudinal axis LA. De facto, the entire underside 11 is in this case formed with such ridges and grooves. In the selected example, seven ridges 20 and six grooves 21 are included.

In the embodiment, the rear shoulder surface 16 consists of a flat surface, which extends not only perpendicular to the longitudinal axis LA but also to the underside 11. By the existence of this flat shoulder surface (instead of a clearance surface), the cutting insert can in practice be given a very good, predeterminable dimensional accuracy (tolerances in the order of 0.001-0.005 mm) by grinding of the cutting edge 15, as well as the flat shoulder surface 16. This original dimensional accuracy will be maintained for the entire service life of the cutting insert (i.e., until the cutting edge has been consumed), as a consequence of the rear shoulder surface only having the purpose of abutting against an adjusting mechanism and not serving as any clearance surface.

As seen in FIGS. 15 and 16, the rear part of the cutting insert is—in addition to the shoulder surface 16—delimited by two flat side surfaces 22a, 22b, which run parallel to the longitudinal axis LA and are equidistantly separated from the same. In the example, like the clearance surface 17, these side surfaces are inclined in relation to the upper and undersides 10, 11.

In the embodiment shown, the two flank edges 19a, 19b of the cutting insert are unsymmetrical in relation to the longitudinal axis LA by their contours or cutting edge lines being non-uniform. More precisely, an entering flank edge, viz. the flank edge 19a, is formed with a slightly S-like contour shape, while the opposite flank edge 19b has a slightly C-like, convex contour shape. However, the arc height of said convex shape is in practice so small that the cutting edge may appear as approximately straight to the naked eye. By imparting the flank edges with this unsymmetrical shape, the individual cutting insert's entering into and evacuation out of the gashes to be made in the workpiece is facilitated. The slightly S-like contour of the flank edge 19a is particularly suitable for forming involute teeth having relatively deep gashes.

It should furthermore be noted that the hole 13 of the cutting insert is placed with its center axis approximately in the section in which the side surfaces 22a, 22b transform into the clearance surface 17. As may be best seen in FIG. 15, the nose edge 18 is short and straight as well as transforms into the flank edges 19a, 19b via convex transition edges.

Reference is now made to FIG. 21, which illustrates how each individual seat 9 includes a bottom 22 in the form of a serration connecting surface, i.e., a connecting surface, which includes ridges 23 that are separated by grooves and arranged to engage the grooves 21 in the connecting surface of the cutting insert 8. These ridges 23 run radially in relation to the center axis C2 of the basic body. As seen in FIG. 21, the rear part of the bottom of the seat is formed in the proper basic body, while the front or radially outer part of the same is formed on a projection 24, which protrudes radially from the periphery of the basic body. Furthermore, the individual bottom or the connecting surface is laterally tipped-in in relation to the reference plane RP in order to give the cutting insert (of uniform thickness) its desired lateral tipping-in angle β (see FIG. 8), and in an analogous way radially tipped-in in order to give the radial tipping-in angle γ (see FIGS. 11 and 12).

In the bottom of the seat, a hole 25 mouths having a female thread, in which the male thread of a screw 26 for the clamping or fixation of the cutting insert can be tightened. In the rear—or radially inner—part of the seat 9, there is arranged an adjusting mechanism, in its entirety designated 27, for the fine adjustment of the radial position of the cutting insert in relation to the basic body. In the example, a mechanism of the type that is disclosed in more detail in the above-mentioned SE 523286 has been selected, and which includes two jaws 28, 29, one 28 of which is movable by means of a set screw 30. A primary advantage of this adjusting mechanism, known per se, is that the radial position of the cutting insert can be adjusted in extremely fine steps, in that rotation of the set screw one revolution gives a rectilinear displacement of the front jaw 28 of only 0.050 mm. In other words, the cutting insert can be displaced in steps of 0.001 mm by rotation of the set screw approx. 7°.

Reference is now made to FIGS. 22-24, which illustrate a group of three schematically shown cutting inserts 8a, 8b, 8c during the formation of the same number of gashes to be made between adjacent teeth. In these drawing figures, the cutting inserts are shown with their upper sides and the chip surfaces thereof turned downward in the operative states of the cutting inserts (cf. FIGS. 1-6). As has previously been pointed out, the workpiece ring 1 and 365 the tool 2 are rotated in one and the same direction of rotation (see the arrows R1 and R2) at the same time as the tool—and thereby the individual cutting inserts—is given a downwardly directed axial feeding motion V. Of the different cutting inserts, the cutting insert 8a is about to enter a gash to be made in the form of a slot, while the cutting insert 8b already has entered a slot and rotates in the same, besides which the cutting insert 8c is about to leave a machined slot. During its relative rotary motion in the appurtenant slots, the cutting edge of the cutting insert 8b will "carve" or cut out a chip CH, the shape of which will be approximately V- or U-shaped by following the shape of the part of the cutting edge that penetrates into the slot.

As seen in FIG. 23, the individual slot is first entered by the flank edge 19a (cf. FIG. 15), while the flank edge 19b last leaves each finish-machined slot. When the chip has been removed, the same falls down by means of the gravitation and can be evacuated from the machine in a suitable way. When the workpiece ring has rotated sufficiently many revolutions, at the same time as the tool has been axially fed downward sufficiently far to leave the underside of the gear rim (see FIG. 1), the tool is again lifted up to an initial position, in which the same is advanced in the direction of the arrow S for increasing the cutting depth. In practice, this increase of the cutting depth may be within the range of 0.1-0.5 mm.

A general advantage of power skiving as a method for providing gear rims is that the number of tool readjustments is reduced to a minimum simultaneously as both the workpiece ring and the tool can be driven at high number of revolutions. Therefore, the operation of peeling away a material layer, from the moment that the tool has left an upper initial position and has been fed down to a lower position, can be carried out fast without any tool readjustments. The number of radial adjustments naturally depends on the desired depth of the gashes.

The advantages of the above shown and described tool according to the invention are, among others, that the cutting inserts can be radially adjusted with very fine tolerances. Thus, the interacting serration connecting surfaces guarantee that the individual cutting insert can be displaced absolutely straight and radially—either outward or inward—at the same time as the selected adjusting mechanism can determine the radial position of the cutting insert in very fine steps. Therefore, in practice, the nose edges of all cutting inserts along the periphery of the basic body can be adjusted so that they are tangent to a common circle (see FIG. 7) by a margin of error or tolerance of only 0.001-0.002 mm. This ensures that the flanks of the generated teeth obtain a very good surface quality and dimensional accuracy. The fact that the rear ends of the cutting inserts do not include any cutting edge, but have the shape of preferably flat shoulder surfaces, against which an interacting, flat contact surface of an adjusting mechanism may abut, forms the basis of the accuracy of the radial adjustment of the cutting inserts. During the entire service life, there is neither any risk of the cutting edge length, i.e., the distance between the nose edge and the rear shoulder surface, is changed non-uniformly between the different cutting inserts. A further advantage of the invention is that the described radial tipping-in of the cutting inserts makes the same easy-cutting.

The invention is not limited to the embodiment described above and shown in the drawings. Thus, it is feasible to use other guide members than serration connecting surfaces in the interface between the underside of the cutting insert and the bottom of the seat. Therefore, in the underside of the cutting insert, a single female-like or male-like guide member may be formed, which has a long narrow shape and runs parallel to the longitudinal axis of the cutting insert, at the same time as a single, interacting male-like or female-like guide member is formed in the bottom of the seat. When such simple guide members are a possibility, the female member should be formed in the underside of the cutting insert, whereas the male member is included in the bottom of the seat. It is also possible to form the cutting insert with flank edges that are symmetrical in relation to the longitudinal axis of the cutting insert, e.g. when the tooth shapes are easy and the depth of the gashes is moderate. Neither does the basic body of the tool need to be ring-shaped, as shown in the drawings. Thus, the basic body could be a non-hollow head having a peripheral rim, in which the seats for the cutting inserts are formed.

Although the present embodiments have been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A power skiving tool comprising:
a basic body having a peripheral rim located in a reference plane extending perpendicular to a center axis around which the rim is rotationally symmetrical, the rim including a plurality of tangentially spaced-apart seats, which individually include a bottom formed in the rim, as well as in a projection protruding radially from the same and in which a hole having a female thread mouths; and
a plurality of replaceable cutting inserts, each of the plurality of cutting inserts having an upper side, an underside, an endless circumference surface extending between the same, and a through hole, which extends between the upper and undersides, each individual cutting insert having a length extension defined by a longitudinal axis extending between front and rear ends, and including a cutting edge formed between a chip surface included in the upper side and a clearance surface included in the circumference surface, the cutting edge including three part edges, the three part edges being a nose edge and two flank edges converging toward the same, each individual cutting insert being mounted in an appurtenant seat with the nose edge protruding radially from the basic body, and fixed by a tightening screw tightened in the female thread of the hole, besides which the cutting edge of the individual cutting insert is laterally tipped-in at a lateral tipping-in angle of at least 5° in relation to the reference plane of the basic body, wherein each individual cutting insert is formed with only one cutting edge, the nose edge of which forms the front end of the cutting insert, and wherein a rear end of the cutting insert includes a shoulder surface, which runs perpendicular to the longitudinal axis of the cutting insert and is pressed against an adjusting mechanism arranged in an inner part of the seat for the fine adjustment of the radial position of the cutting insert and thereby of the cutting edge in relation to the center axis of the basic body, the underside of the cutting insert including a long narrow, female-like or male-like guide member, which runs parallel to the longitudinal axis of the cutting insert in engagement with an interacting, long narrow male-like or female-like guide member included in the bottom of the seat.

2. The tool according to claim 1, wherein said guide members in the underside of the cutting insert and in the bottom of the seat are included in serration connecting surfaces of the type forming a plurality of mutually parallel ridges and grooves.

3. The tool according to claim 1, wherein the rear shoulder surface of the cutting insert is flat, and extends at a right angle to the longitudinal axis of the cutting insert and the underside thereof.

4. The tool according to claim 1, wherein the two flank edges of the cutting insert are unsymmetrical in relation to the longitudinal axis of the cutting insert by having a different contour shape.

5. The tool according to claim 4, wherein an entering flank edge included in the cutting insert has a slightly S-like contour shape and another flank edge has a slightly C-like, convex contour shape.

6. The tool according to claim 1, wherein the cutting edges of the individual cutting insert are radially tipped-in at a radial tipping-in angle in relation to the reference plane.

7. The tool according to claim 6, wherein the radial tipping-in angle is at least 2° and at most 15°.

8. The tool according to claim 7, wherein the radial tipping-in angle is 10°.

9. The tool according to claim 1, wherein the lateral tipping-in angle is at most 30°.

10. The tool according to claim 9, wherein the lateral tipping-in angle is 20°.

11. A cutting insert for a power skiving tool, comprising:
an upper side;
an underside;
an endless circumference surface extending between the upper side and underside;
a through hole extending between the upper and underside;
a length extension defined by a longitudinal axis extending between front and rear ends; and
a cutting edge formed between a chip surface included in the upper side and a clearance surface included in the circumference surface, the cutting edge having three part edges, the three part edges being a nose edge and two flank edges converging toward the nose edge, wherein the cutting insert is formed with only one cutting edge, the nose edge of which forms the front end of the cutting insert, and the rear end of the cutting insert forming a shoulder surface, which runs perpendicular to the longitudinal axis of the cutting insert, the underside including a guide member, which runs parallel to the longitudinal axis, the two flank edges being unsymmetrical in relation to the longitudinal axis of the cutting insert by having a different contour shape.

12. The cutting insert according to claim 11, wherein said guide member is included in a serration connecting surface having a plurality of mutually parallel ridges and grooves.

13. The cutting insert according to claim 11, wherein the rear shoulder surface is flat and extends perpendicular to both the longitudinal axis of the cutting insert and the underside.

14. The cutting insert according to claim 11, wherein one flank edge has a slightly S-like contour shape, whereas the other flank edge has a slightly C-like, convex contour shape.

* * * * *